US012780421B2

(12) United States Patent
Hoover et al.

(10) Patent No.: US 12,780,421 B2
(45) Date of Patent: Nov. 3, 2026

(54) VEHICLE OPERATOR SEAT INCORPORATING PIVOTING HIP ARMOR

(71) Applicant: AMI Industries, Inc., Colorado Springs, CO (US)

(72) Inventors: Douglas E. Hoover, Colorado Springs, CO (US); Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 168 days.

(21) Appl. No.: 18/933,713

(22) Filed: Oct. 31, 2024

(65) Prior Publication Data

US 2026/0116540 A1 Apr. 30, 2026

(51) Int. Cl.
*B64D 11/06* (2006.01)

(52) U.S. Cl.
CPC ................................ *B64D 11/0619* (2014.12)

(58) Field of Classification Search
CPC ........................ B64D 11/0619; B64D 11/0698
See application file for complete search history.

(56) References Cited

U.S. PATENT DOCUMENTS 3,420,475 A 1/1969 Roberts et al.
4,358,154 A * 11/1982 Campbell ............ B60N 2/4242 188/372
5,164,536 A 11/1992 Barbaza et al.
5,419,614 A 5/1995 Richards et al.
6,073,884 A 6/2000 Lavergne
8,408,643 B2 * 4/2013 Honnorat ........... B64D 11/0619 297/216.17
9,421,886 B2 * 8/2016 Cecinas ............. B64D 11/0689
11,794,904 B2 * 10/2023 Pacheco ............. B60N 2/42709
11,945,590 B1 * 4/2024 Pacheco ............. B64D 11/0619
12,049,321 B2 * 7/2024 Pacheco ................. B64D 25/04
12,195,187 B2 * 1/2025 Pacheco ............... B60N 2/4242
12,233,762 B2 * 2/2025 Hasan ................ B60N 2/42709
12,240,610 B2 * 3/2025 Bolukbasi .......... B64D 11/0648
(Continued)

FOREIGN PATENT DOCUMENTS

AT 863943 T 5/2011
AU 462155 B 7/1975
(Continued)

*Primary Examiner* — David R Dunn
*Assistant Examiner* — Jessica Kathryn Thompson
(74) *Attorney, Agent, or Firm* — Suiter Swantz IP

(57) ABSTRACT

A seating assembly for a pilot or operator of a rotorcraft, aircraft, or other vehicle includes a seat base comprising base side panels, each panel having a cam surface on its forward face capable of accepting a cam follower. A seat bucket translates relative to the seat base, adjustably up or down through a tracking region and down through a stroking region in response to an impact event; the cam surfaces likewise include an upper portion corresponding to the tracking region and a lower portion corresponding to the stroking region. The seating assembly includes hip armor panels connected to the seat bucket and coplanar with the base side panels, each armor panel including a cam follower translatable along the cam surface such that when the seat bucket tracks through the stroking region the cam followers translate through the lower portion of the cam surface, pivoting the hip armor panels upward.

8 Claims, 7 Drawing Sheets

(56) References Cited

U.S. PATENT DOCUMENTS

| | | | | |
|---|---|---|---|---|
| 12,552,539 | B2 * | 2/2026 | Hoover .............. | B64D 11/0619 |
| 2017/0232929 | A1 * | 8/2017 | McGovern ......... | B64D 11/0619 297/411.1 |
| 2025/0162716 | A1 * | 5/2025 | Hong ................. | B64D 11/0619 |
| 2025/0250012 | A1 * | 8/2025 | Hoover .................. | B64D 25/04 |

FOREIGN PATENT DOCUMENTS

| | | | |
|---|---|---|---|
| CA | 938601 | A | 12/1973 |
| CN | 116424557 | A | 7/2023 |
| EP | 0293786 | A3 | 12/1988 |
| GB | 2488355 | B | 8/2012 |
| WO | 2024072359 | A1 | 4/2024 |

* cited by examiner

VEHICLE OPERATOR SEAT INCORPORATING PIVOTING HIP ARMOR

BACKGROUND

Pilot or operator seats for military aircraft, particularly rotorcraft, require armor to protect the occupant. Incorporating armor can substantially enlarge the dimensions of the seat bucket. For example, an armored bucket may provide protection from the rear and from the underside, as well as on the left or right sides (e.g., with respect to the occupant's hips). However, the hip armor panels greatly increase the width of the seat bucket, which in turn increases the width required for the seat base and the seating assembly generally, which may complicate placement in an aircraft cockpit where space is at a premium.

Further, integrated seat bucket armor may require complex faceting in order to fit within the seat base while providing protection. For example, faceting prevents the armored bucket from colliding with the seat base, e.g., during an impact event when the seat strokes downward and incorporates energy attenuation (EA) devices to protect the occupant from the impact. Further still, the armored bucket is fashioned of materials (e.g., boron carbide) that are both expensive and difficult to shape.

SUMMARY

In an aspect, a seating assembly for a pilot or operator of a rotorcraft, aircraft, or other vehicle is disclosed. In embodiments, the seating assembly includes a seat base mountable to a cabin floor of the aircraft or vehicle and including base side panels, e.g., on the left and right sides. Each base side panel includes a cam surface on its forward face, the cam surface configured for accepting a cam follower. The seating assembly includes a seat bucket disposed between the base side panels and configured for tracking relative to the seat base. For example, the seat bucket may be adjusted up or down through a tracking region (e.g., tracking along interior slots in each base side panel), and may stroke downward through a stroking region below the tracking region (e.g., in response to an impact event). Each cam surface likewise includes an upper portion (corresponding to the tracking portion) and a lower portion (corresponding to the stroking portion). Hip armor panels are attached to the seat bucket (e.g., at a pivot point) on the left and right sides, coplanar with the base side panels. Each hip armor panel includes a cam follower capable of translating along the cam surface of the corresponding base side panel. For example, the cam followers track along the upper portions of the cam surfaces as the seat bucket translates through the tracking region. When the seat bucket strokes downward through the stroking region, the cam followers track along the lower portions of the cam surfaces such that the hip armor panels pivot forward, e.g., to provide continued protection to the hip area of the seat occupant.

In some embodiments, the seat bucket includes a down stop on its left and right sides, the corresponding hip armor panel capable of resting on the down stop for support.

In some embodiments, the down stop includes a flanged end additionally capable of restricting lateral movement of the hip armor panel.

In some embodiments, the cam followers include rollers capable of engaging with the cam surface.

In some embodiments, the cam follower is shaped so as not to directly contact the upper portion of the cam surface (e.g., when the seat bucket is translating through the tracking portion) but directly engages with the lower portion of the cam surface when the seat bucket strokes downward through the stroking portion.

In some embodiments, the hip armor panel is connected to the seat bucket via a single pivot point.

In some embodiments, the armor panel includes an armrest fixed to the armor panel, such that the armrest pivots with the armor panel when the seat bucket strokes downward through the stroking region.

In some embodiments, the seat bucket includes an armrest connected thereto at a pivot point, such that when the seat bucket strokes downward and the hip armor pivots upward, the hip armor panel articulates the armrest upward as well.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
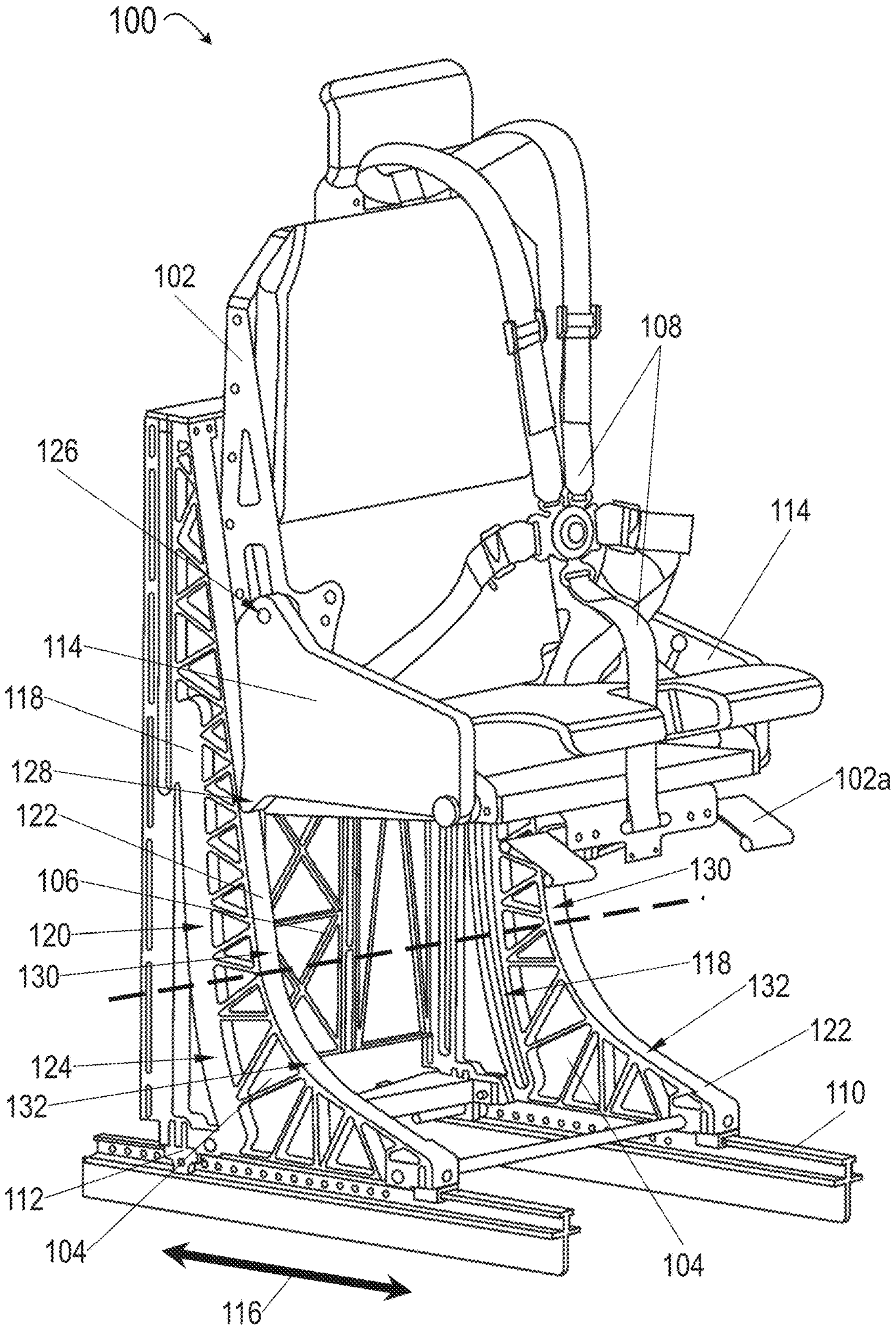
FIG. 1 is an isometric view of a vehicular seating assembly incorporating pivoting hip armor according to example embodiments of this disclosure.
Figure 2B:
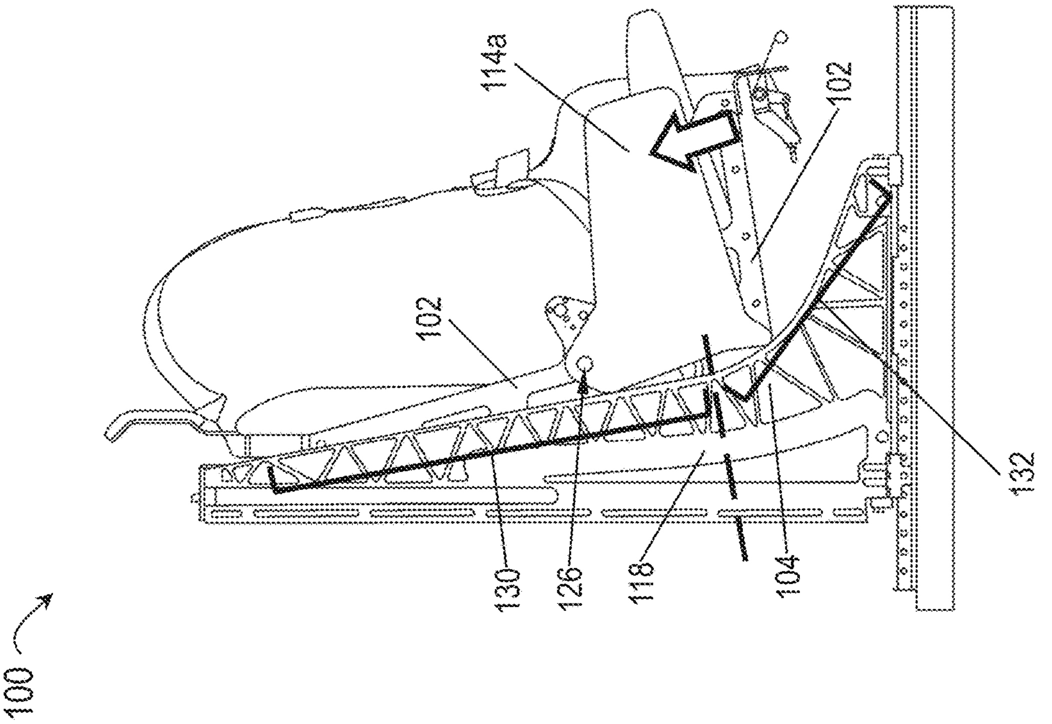
FIGS. 2A and 2B are respectively isometric and profile views of the vehicular seating assembly of FIG. 1 in a partially stroked/partially pivoted configuration.
Figure 2A:
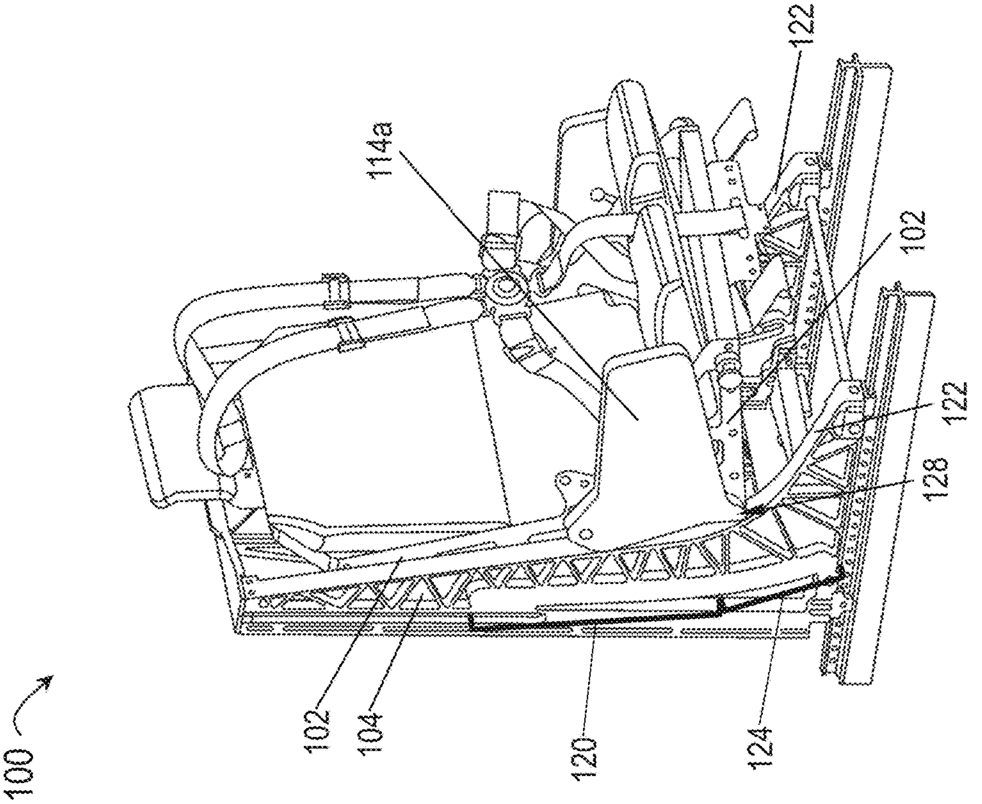

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a vehicular seating assembly for a rotorcraft, aircraft, or other vehicle (e.g., ground-based, water-based) incorporating pivoting hip armor for protection of the occupant. For example, instead of the conventional armored bucket, whose complex unibody faceted design adds width to the seat bucket and is difficult to fabricate, protection is provided via pivoting hip armor panels that track up and down with the seat bucket (e.g., which can be adjusted to accommodate pilots or operators of varying heights). However, when a crash or impact event occurs and the seat bucket strokes downward (e.g., for energy attenuation to absorb and dissipate downward force associated with the impact event), the armor panels pivot upward, protecting the operator and preventing a collision with the seat base. In some embodiments, the seat bucket and armor panels fit within the standard seat base, with the hip armor panels in the same vertical plane as the seat base, allowing for new installation or retrofitting of existing seating assemblies.

Referring now to FIG. 1, a vehicular seating assembly 100 is disclosed. For example, the seating assembly 100 may include seat bucket 102, seat base side panels 104, seat base rear panels 106, seat harness 108, floor tracks 110, floor track fittings 112, and hip armor panels 114.

In embodiments, the seat bucket 102 may incorporate a seatpan and seatback/backrest collectively configured for supporting an occupant of the seating assembly 100, e.g., a pilot or operator of the vehicle. For example, the occupant may be secured to the seat bucket 102 via the seat harness 108.

In embodiments, the seating assembly 100 may be mounted to a cockpit or cabin floor of a vehicle via the seat base side panels 104. For example, the seat base proper of the seating assembly 100 may include seat base side panels 104 on the left and right sides (e.g., inboard or outboard, relative to the seating assembly itself) of the seating assembly, the seat base side panels connected by a seat base rear panel 106 behind the seat bucket 102. Further, the seat base side panels 104 may each mount (e.g., via floor track fittings 112) to parallel floor tracks 110 set into a cockpit or cabin floor of the aircraft or vehicle. In some embodiments, the seating assembly 100 may track forward or backward (116; e.g., in a longitudinal direction relative to the aircraft or vehicle) relative to the floor tracks 110.

In embodiments, the seat bucket 102 may be slidably connected to the seat base side panels 104, e.g., via tracking members (not shown) configured for translating along tracking slots 118 set into the interior face of each seat base side panel. For example, the occupant may adjust the seat bucket 102 (e.g., via release 102*a*, allowing movement of the seat bucket relative to the base side panels 104) to a higher or lower height or vertical position by causing the seat bucket to translate along the tracking slots (e.g., through a tracking region 120 between a minimum height and a maximum height).

In embodiments, each seat base side panel 104 may incorporate a cam surface 122 along its forward edge (e.g., based on the orientation of the seat base side panel relative to the aircraft or vehicle). For example, the cam surface 122 may incorporate a substantially flat surface of consistent width extending partially or fully between the top and bottom of the seat base side panel 104. In some embodiments, the cam surface 122 may incorporate a slot (not shown) within which a cam follower may translate.

In embodiments, the seating assembly 100 may be configured for energy attenuation (EA) in response to an impact event, e.g., a crash associated with significant downward force capable of injuring the occupant. For example, in response to an impact event, the seat bucket 102 may stroke downward past the minimum height, e.g., through a stroking region 124 of the tracking slots 118. The stroking region 124 may be curved and/or may incorporate EA devices to absorb or dissipate downward force on the seat bucket 102 and protect the occupant of the seating assembly 100.

In embodiments, the hip armor panels 114 may provide protection of the operator's hip region. For example, the seating assembly 100 may incorporate a hip armor panel 114 on one side (e.g., an outboard or right side) attached to the corresponding side of the seat bucket 102 at a single pivot point 126. The hip armor panels 114 may have a substantially quadrangular shape, e.g., with the pivot point 126 at top rear and a cam follower 128 at bottom rear (e.g., based on the orientation of the hip armor panels relative to the seating assembly 100 and to the aircraft or vehicle).

In embodiments, the cam follower 128 may translate fully or partially along the cam surface 122 as the seat bucket 102 tracks relative to the seat base side panels 104. For example, the cam follower 128 may comprise a rounded edge of the hip armor panel 114 and may be covered or treated so as to reduce friction between the cam follower 128 and the cam surface 122. As described in greater detail below, in some embodiments the cam follower 128 may incorporate a roller or other rolling member capable of engaging with the cam surface 122; in other embodiments the cam follower 128 may be shaped so as to engage directly with the cam surface 122 only within the stroking region 124 and not with in the tracking region 120. In some embodiments the cam surface 122 may include a slot (not shown) within which the cam follower 128 may translate.

In embodiments, an upper portion 130 of the cam surface 122 may substantially match the incline of the tracking slots 118 through the tracking region 120, such that while the seat bucket 102 translates through the tracking region the hip armor panels 114 are maintained at a substantially consistent orientation relative to the seat bucket and the seat base side panels 104. However, in embodiments a lower portion 132 of the cam surface 122 may curve in a forward direction (e.g., relative to the seating assembly 100 and to the vehicle) corresponding to the stroking region 124. For example, when the seat bucket 102 strokes downward through the stroking region 124, the engagement of the cam follower 128 with the curvature of the lower portion 132 of the cam surface 122 may pivot the hip armor panels 114 upward, as shown below.

Referring now to FIGS. 2A through 3B, the seating assembly 100 is shown in partially stroked (FIGS. 2A and 2B) and fully stroked (FIGS. 3A and 3B) configurations.

Figure 3A:
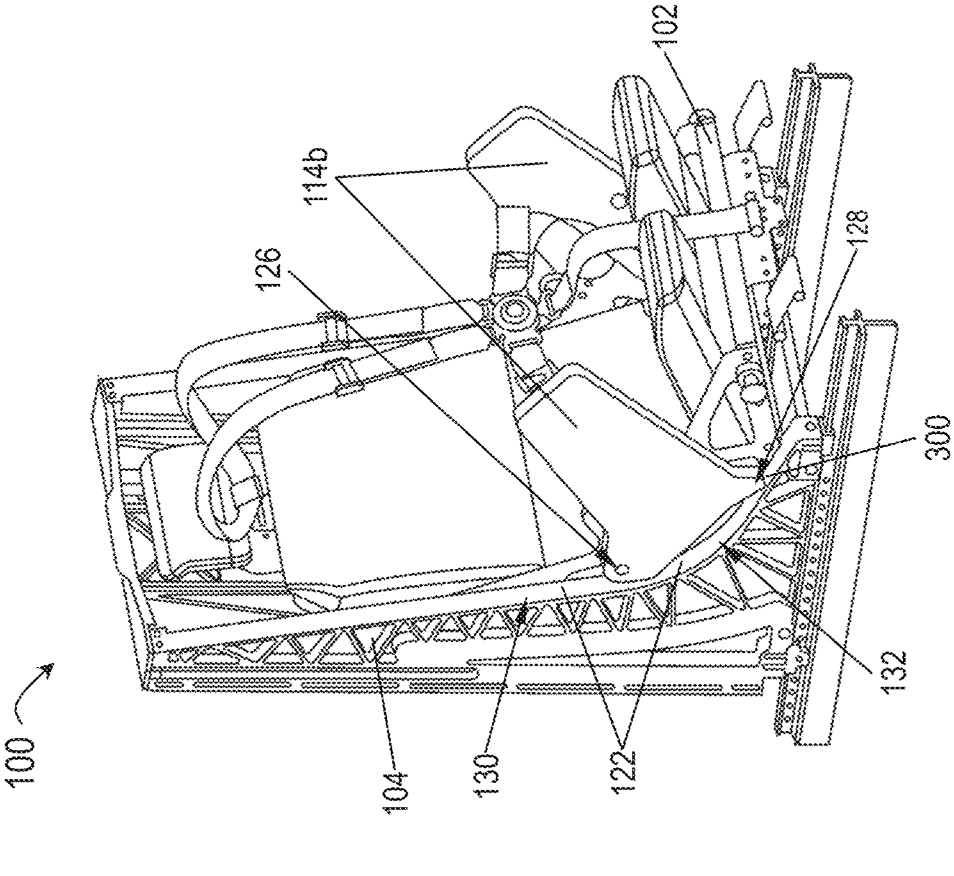
FIGS. 3A and 3B are respectively isometric and profile views of the vehicular seating assembly of FIG. 1 in a fully stroked/fully pivoted configuration.
Figure 3B:
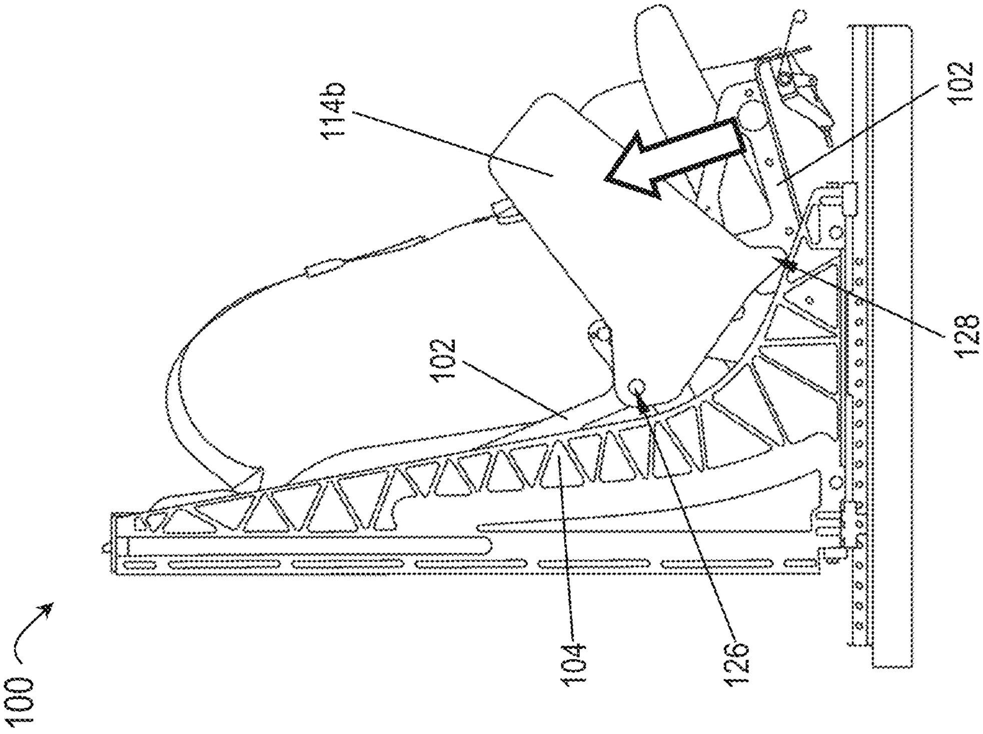

In embodiments, when the seat bucket 102 tracks downward beyond the tracking region 120 into the stroking region 124 (e.g., in response to an impact event) the cam follower 128 begins to translate along the lower portion 132 of the cam surface 122. As a result, referring in particular to FIGS. 2A and 2B, the hip armor panel (114, FIG. 1) pivots upward (114*a*) relative to the pivot point 126 (and therefore relative to the seat bucket 102 and seat base side panel 104). Referring in particular to FIGS. 3A and 3B, as the cam follower 128 continues to translate along the lower portion 132 of the cam surface 122, the hip armor panel pivots further upward (114*b*) to protect the operator's hip region and prevent the hip armor panels from binding or otherwise engaging with the seat base side panels 104.

in some embodiments, referring to FIG. 3A, the cam follower 128 may incorporate a roller 300 or other rolling member capable of engaging with the cam surface 122.

Figure 4:
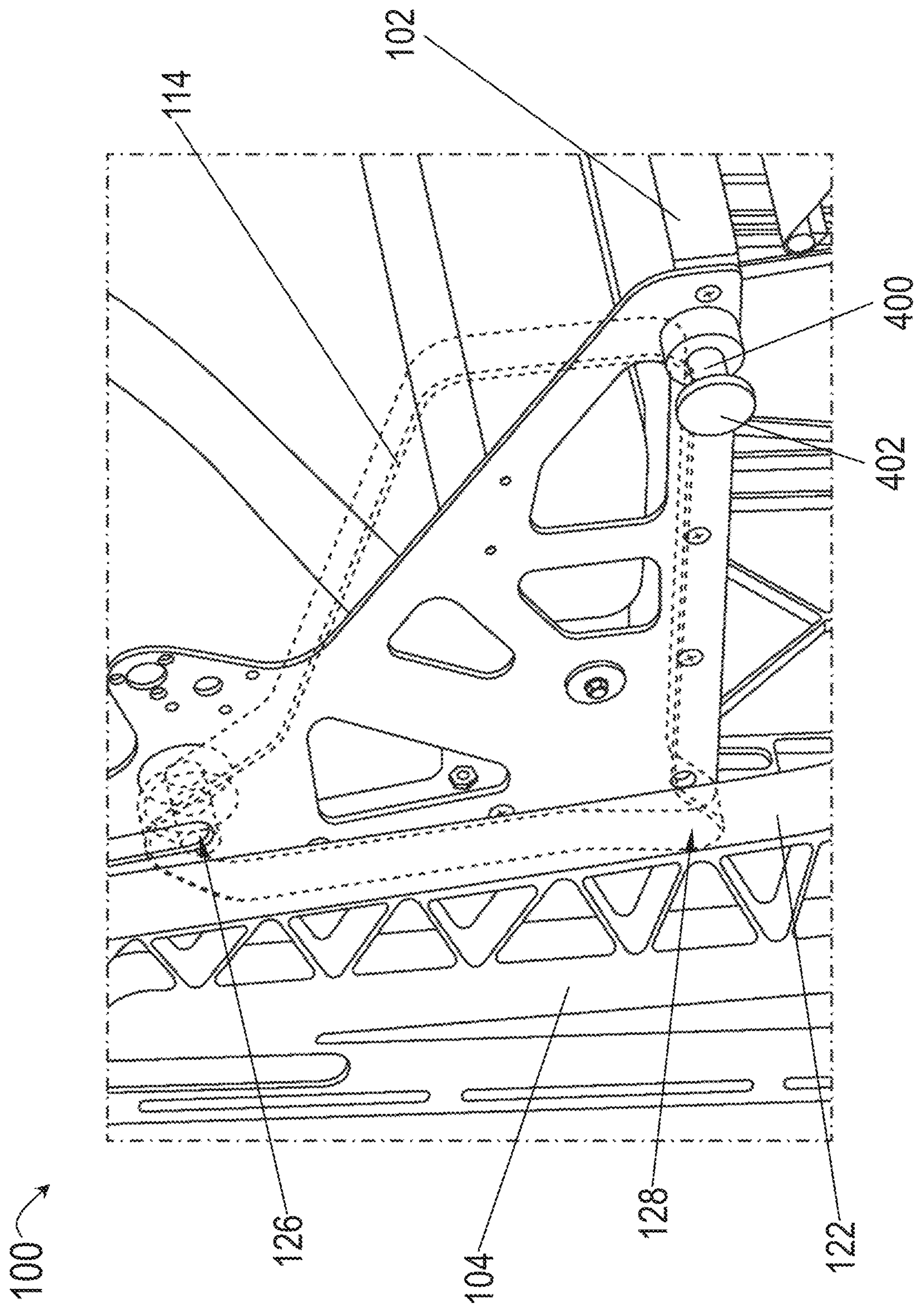
FIG. 4 is a detailed side view of the vehicular seating assembly and pivoting hip armor of FIG. 1.

Referring now to FIG. 4, the seat bucket 102, seat base side panel 104, hip armor panel 114, and pivot point 126 are shown.

In embodiments, the seat bucket 102 may include a down stop 400 projecting in an outboard or inboard direction from the seat bucket. For example, the down stop 400 may provide support for the hip armor panel 114 when the seat bucket 102 is in a normal mode (e.g., tracking through the tracking region (120, FIG. 1) of the tracking slot (118, FIG. 1), as opposed to a crash mode or impact mode when the seat bucket is stroking downward through the stroking region (124, FIG. 1) in response to an impact event). In some embodiments, the down stop 400 may further include a flanged end 402 to restrict lateral vibration or movement of the hip armor panel 114 relative to the seat bucket 102.

Figure 5:
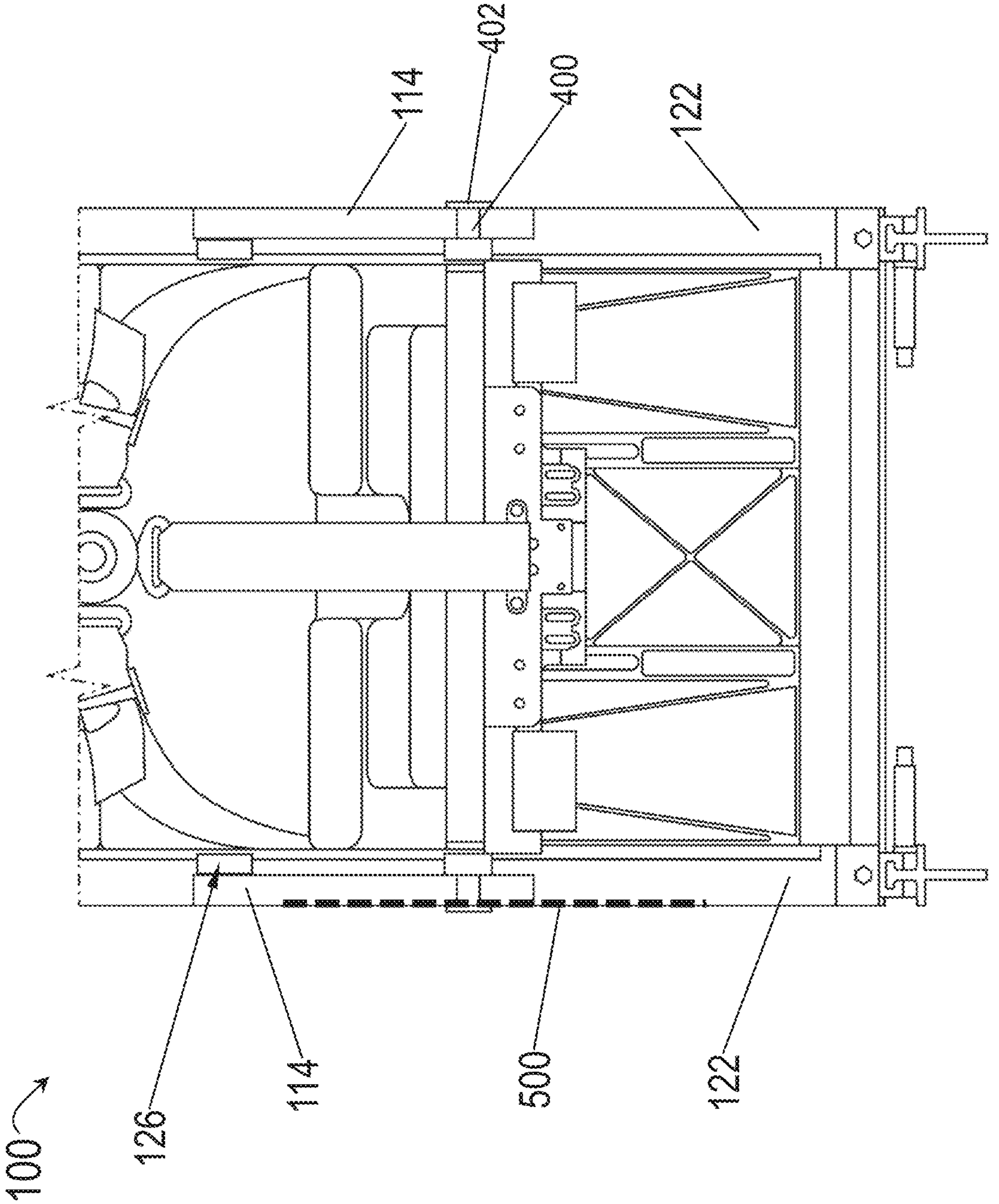
FIG. 5 is a forward view of the vehicular seating assembly and pivoting hip armor of FIG. 1.

Referring now to FIG. 5, the seating assembly 100 is shown.

In embodiments, the hip armor panels 114 may be substantially coplanar with the seat base side panels 104, such that the width of the seat bucket 102 including the hip armor panels does not exceed the width of the seating assembly 100 (i.e., the width between the seat base side panels). In some embodiments, the hip armor panels 114 (e.g., an outboard face or surface thereof) may be disposed in substantially the same vertical plane (500) as the seat base side panels.

Figure 6B:
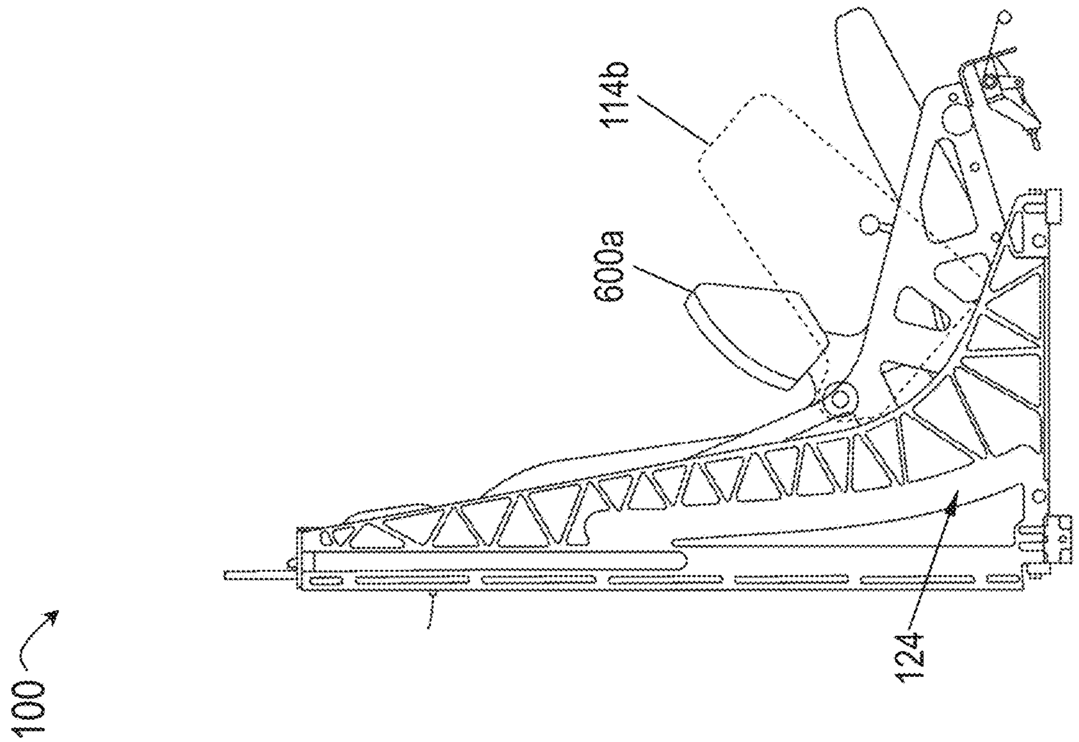
FIGS. 6A and 6B are profile views of the vehicular seating assembly and pivoting hip armor of FIG. 1 (with fixed armrest) in respectively an upright and fully stroked/fully pivoted position.
Figure 6A:
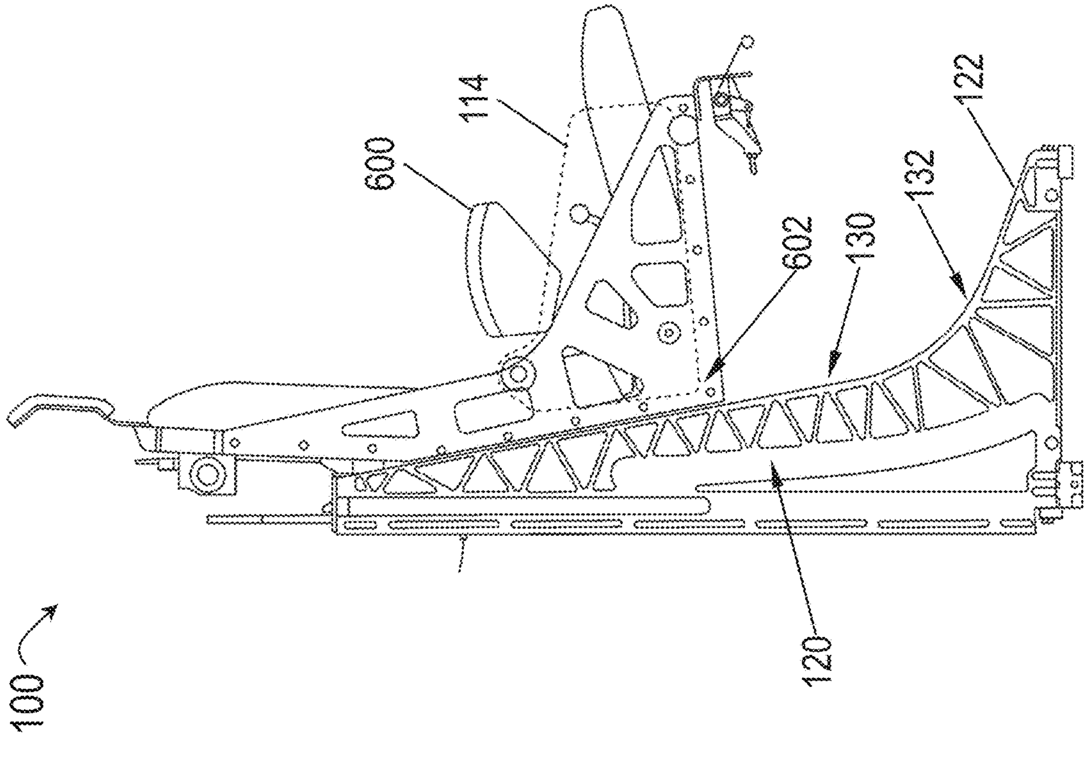

Referring now to FIGS. 6A and 6B, the seating assembly 100 is shown respectively in a normal-mode (FIG. 6A) and an impact-mode (FIG. 6B) configuration.

In embodiments, the seating assembly 100 may incorporate a fixed armrest 600 fixed to the hip armor panels 114 on one or both sides of the seating assembly. For example, the fixed armrest 600 may be sized, shaped, and positioned (e.g., relative to the hip armor panel 114) based on ergonomic considerations.

Referring in particular to FIG. 6B, when the seat bucket 102 is in the impact mode (e.g., stroking downward through the stroking region 124), the fixed armrest 600*a* may pivot upward along with the hip armor panel 114*b* to which the armrest is fixed.

In some embodiments, referring back to FIG. 6A, the hip armor panel 114 may include a reshaped cam follower 602. For example, the reshaped cam follower 602 may be rounded off, truncated, or otherwise reshaped such that no physical contact occurs between the reshaped cam follower and the upper portion 130 of the cam surface 122 while the seat bucket 102 is in normal mode, e.g., while the seat bucket translates through the tracking region 120.

In embodiments, referring in particular to FIG. 6B, the reshaped cam follower 602 may contact only the lower portion 132 of the cam surface while the seat bucket 102 is in impact mode, e.g., while the seat bucket translates downward through the stroking region 124.

Figure 7B:
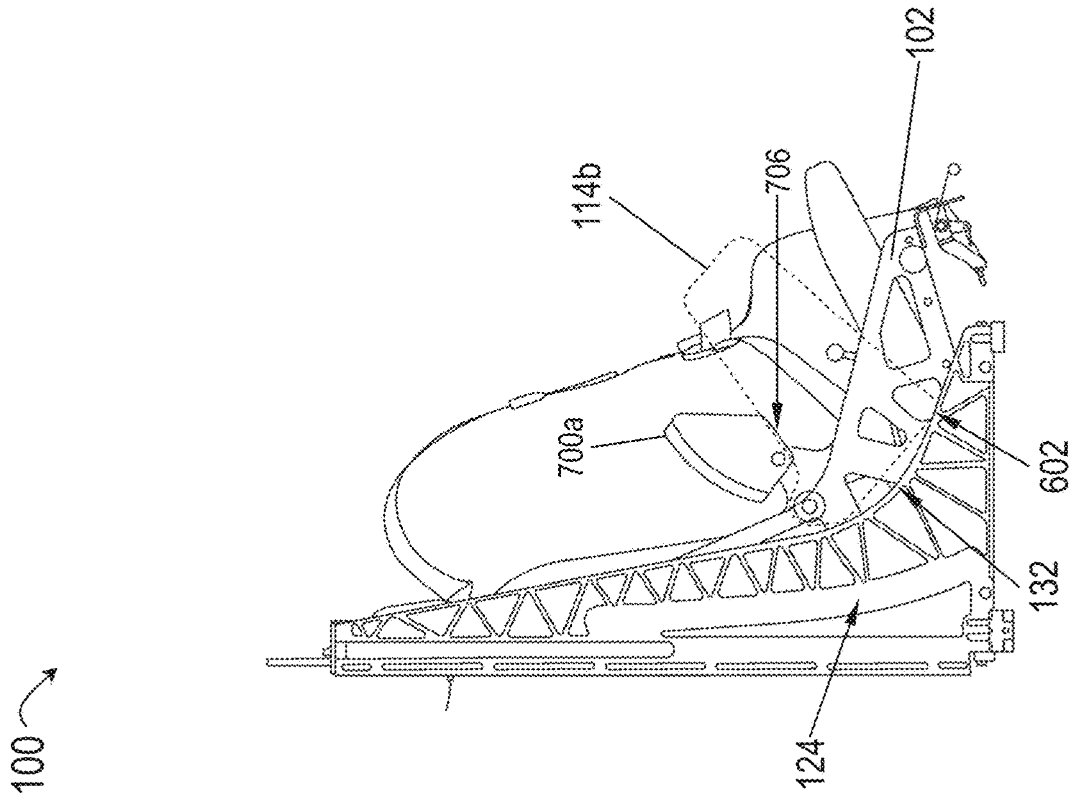
FIGS. 7A and 7B are profile views of the vehicular seating assembly and pivoting hip armor of FIG. 1 (with pivoting armrest) in respectively an upright and fully stroked/fully pivoted position.
Figure 7A:
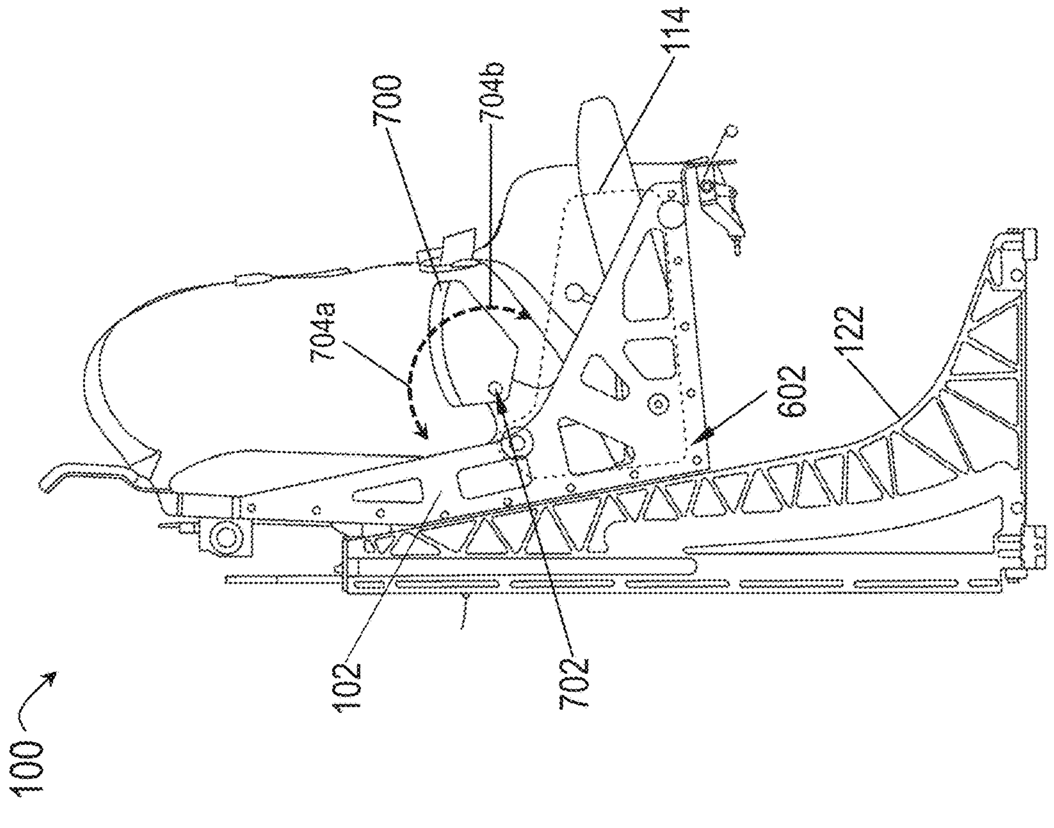

Referring now to FIGS. 7A and 7B, the seating assembly 100 is shown respectively in a normal-mode (FIG. 7A) and an impact-mode (FIG. 7B) configuration.

In embodiments, the seating assembly 100 may incorporate a pivoting armrest 700 attached to the left or right (inboard/outboard) side of the seat bucket 102 at a pivot point 702. For example, similarly to the fixed armrest 600 of FIGS. 6A and 6B, the pivoting armrest 700 may be sized, shaped, and positioned (e.g., relative to the seating assembly 100) based on ergonomic concerns.

In embodiments, referring in particular to FIG. 7A and similarly to the fixed armrest 600 of FIG. 6A, the pivoting armrest 700 may maintain a consistent position and orientation relative to the seat bucket 102 and hip armor panel 114 while the seat bucket is in the normal mode. However, in some embodiments the pivoting armrest 700 may be adjusted by the occupant relative to the pivot point 702, e.g., by pivoting the pivoting armrest upward 704*a* or downward 704*b* relative to the seat bucket 102.

In embodiments, referring also to FIG. 7B, when the seat bucket 102 is in impact mode, e.g., stroking downward through the stroking region 124, and when the cam follower (128, FIG. 1) or reshaped cam follower 602 is translating through the lower portion 132 of the cam surface 122, causing the hip armor panel 114*b* to pivot upward, the pivoting hip armor panel may articulate the pivoting armrest 700*a* upward as well (e.g., by its lower edge 706).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A vehicular seating assembly, comprising:

a seat base mountable to a floor of a vehicle via at least one base side panel, wherein each base side panel includes a cam surface facing in a forward direction;

a seat bucket configured for supporting an operator of the vehicle, the seat bucket configured for translation relative to the seat base through a tracking region associated with an adjustment of the seat bucket relative to the seat base and a stroking region associated with an impact event;

wherein the cam surface comprises an upper portion corresponding to the tracking region and a lower portion corresponding to the stroking region;

and at least one armor panel pivotably connected to the seat bucket on a left or right side of the seat bucket;

wherein each armor panel is coplanar with the at least one base side panel;

wherein each armor panel includes a cam follower configured for translation along the cam surface as the seat bucket translates relative to the seat base; and wherein each armor panel is configured to pivot in an upward direction relative to the seat bucket as the seat bucket translates through the stroking region.

2. The vehicular seating assembly of claim 1, further comprising:

at least one down stop attached to the seat bucket on the left or right side, each down stop configured to support the associated armor panel.

3. The vehicular seating assembly of claim 2, wherein the at least one down stop includes a flanged end capable of restricting lateral movement of the associated armor panel.

4. The vehicular seating assembly of claim 1, wherein at least one cam follower includes a roller configured for engagement with the cam surface.

5. The vehicular seating assembly of claim 1, wherein at least one cam follower does not directly engage with the upper portion of the cam surface but directly engages with the lower portion of the cam surface when the seat bucket translates through the stroking region.

6. The vehicular seating assembly of claim 1, wherein the at least one armor panel is pivotably connected to the seat bucket at a single pivot point.

7. The vehicular seating assembly of claim 1, wherein at least one armor panel further comprises an armrest fixed to the armor panel and configured to support an arm of the operator, the armrest configured to pivot with the armor panel when the seat bucket translates through the stroking region.

8. The vehicular seating assembly of claim 1, wherein the seat bucket further comprises at least one armrest pivotably connected to the seat bucket on the left or right side, the armrest capable of being articulated in the upward direction by the pivoting armor panel.

* * * * *